US011472920B2

(12) United States Patent
Sreeramagiri et al.

(10) Patent No.: US 11,472,920 B2
(45) Date of Patent: Oct. 18, 2022

(54) METHOD FOR PREPARING A POLY(PHENYLENE ETHER) AND POLY(PHENYLENE ETHER) PREPARED THEREBY

(71) Applicant: SABIC Global Technologies B.V., Bergen op Zoom (NL)

(72) Inventors: Sivakumar Sreeramagiri, Bangalore (IN); Samir Anapat, Bangalore (IN); Rajesh Chowdhury, Bangalore (IN); Ravinath Manchana, Bangalore (IN); Bhanu Kiran Vankayala, Bangalore (IN); Hareesh Shamrao Deshpande, Bangalore (IN)

(73) Assignee: SHPP GLOBAL TECHNOLOGIES B.V., Bergen op Zoom (NL)

(*) Notice: Subject to any disclaimer, the term of this patent is extended or adjusted under 35 U.S.C. 154(b) by 470 days.

(21) Appl. No.: 16/683,452

(22) Filed: Nov. 14, 2019

(65) Prior Publication Data

US 2020/0231750 A1 Jul. 23, 2020

(30) Foreign Application Priority Data

Jan. 22, 2019 (EP) .................................... 19152984

(51) Int. Cl.
*C08G 65/44* (2006.01)
(52) U.S. Cl.
CPC .................................... *C08G 65/44* (2013.01)
(58) Field of Classification Search
CPC ....................................................... C08G 65/44
USPC ........................................................ 528/219
See application file for complete search history.

(56) References Cited

U.S. PATENT DOCUMENTS

| | | | |
|---|---|---|---|
| 3,306,874 A | 2/1967 | Hay | |
| 3,306,875 A | 2/1967 | Hay | |
| 3,384,619 A | 5/1968 | Hori et al. | |
| 3,639,656 A | 2/1972 | Bennett et al. | |
| 3,642,699 A | 2/1972 | Cooper et al. | |
| 3,661,848 A | 5/1972 | Cooper et al. | |
| 3,733,299 A | 5/1973 | Cooper et al. | |
| 3,838,102 A | 9/1974 | Bennett et al. | |
| 3,914,266 A | 10/1975 | Hay | |
| 3,951,917 A | 4/1976 | Floryan et al. | |
| 4,028,341 A | 6/1977 | Hay | |
| 4,039,510 A | 8/1977 | Cooper et al. | |
| 4,054,553 A | 10/1977 | Olander | |
| 4,092,294 A | 5/1978 | Bennett, Jr. et al. | |
| 4,477,649 A | 10/1984 | Mobley | |
| 4,477,650 A | 10/1984 | Mobley | |
| 4,556,699 A | 12/1985 | Bialy et al. | |
| 4,578,449 A | 3/1986 | Mobley | |
| 4,675,377 A * | 6/1987 | Mobley .................. | C08G 65/44 528/214 |
| 4,696,996 A * | 9/1987 | Brandt .................. | B01J 19/1881 528/214 |
| 4,705,843 A * | 11/1987 | Stammann ............. | C08G 65/44 528/214 |
| 4,788,277 A | 11/1988 | Ibe et al. | |
| 5,599,510 A | 2/1997 | Kaminsky et al. | |
| 6,472,499 B1 | 10/2002 | Braat et al. | |
| 6,586,567 B2 | 7/2003 | Takeda et al. | |
| 7,541,421 B2 * | 6/2009 | Carrillo ................. | C08L 71/126 528/219 |
| 8,025,158 B2 | 9/2011 | Delsman et al. | |
| 8,215,495 B2 | 7/2012 | Delsman et al. | |
| 8,507,636 B2 | 8/2013 | Delsman et al. | |
| 10,017,457 B2 | 7/2018 | Ma et al. | |
| 2008/0033141 A1 | 2/2008 | Bates et al. | |
| 2009/0211967 A1 | 8/2009 | Delsman et al. | |
| 2018/0079863 A1* | 3/2018 | Ghanta ................. | C08G 65/44 |

FOREIGN PATENT DOCUMENTS

| | | |
|---|---|---|
| CN | 101899150 A | 12/2010 |
| DE | 3512759 A1 | 10/1986 |
| EP | 0103154 A1 | 3/1984 |
| EP | 0179314 A1 | 4/1986 |
| EP | 0194584 A1 | 9/1986 |
| EP | 0197469 A2 | 10/1986 |
| EP | 1439209 A1 | 7/2004 |
| EP | 1832617 A2 | 9/2007 |
| GB | 1333511 A | 10/1973 |
| JP | H0710985 A | 1/1995 |
| JP | H10212350 A | 8/1998 |
| WO | 2006083250 A1 | 8/2006 |
| WO | 2017105782 A1 | 6/2017 |

* cited by examiner

Primary Examiner — Hui H Chin
(74) Attorney, Agent, or Firm — Cantor Colburn LLP

(57) ABSTRACT

A method for preparing a poly(phenylene ether) includes feeding air to a continuous flow reactor that contains a reaction mixture including a phenol, a transition metal catalyst, and an organic solvent; and oxidatively polymerizing the reaction mixture at a specified temperature and pressure to form a poly(phenylene ether). The reaction mixture has a residence time in the continuous flow reactor of less than or equal to 30 minutes. Poly(phenylene ether)s prepared by the method and articles including the poly(phenylene ether)s are also described.

16 Claims, No Drawings

METHOD FOR PREPARING A POLY(PHENYLENE ETHER) AND POLY(PHENYLENE ETHER) PREPARED THEREBY

CROSS-REFERENCE TO RELATED APPLICATION

This application claims priority to and the benefit of EP Application No. 19152984.1, filed Jan. 22, 2019, the contents of which are incorporated herein by reference in their entirety.

BACKGROUND

Poly(phenylene ether)s constitute a family of engineering thermoplastics that are highly regarded for their chemical and physical properties. Poly(phenylene ether)s can be prepared by the oxidative coupling of a phenol with oxygen in the presence of a catalyst (e.g., a copper-amine catalyst). Typical preparation of poly(phenylene ether)s is based on batch processes. Batch operation can suffer from limitations including variation in batch to batch product quality. There accordingly remains a need in the art for an improved process for preparation of poly(phenylene ether)s capable of providing a polymer product with decreased reaction times.

SUMMARY

A method for preparing a poly(phenylene ether) comprises feeding air to a continuous flow reactor that contains a reaction mixture comprising a phenol, a transition metal catalyst, and an organic solvent; and oxidatively polymerizing the reaction mixture at a temperature of 20 to 60° C., preferably 25 to 55° C., more preferably 30 to 50° C. and a pressure of greater than 150 kPa, preferably greater than or equal to 200 kPa, more preferably greater than or equal to 500 kPa, even more preferably greater than or equal to 1000 kPa to form a poly(phenylene ether); wherein the reaction mixture has a residence time in the continuous flow reactor of less than or equal to 30 minutes, preferably 3 to 20, more preferably 3 to 15 minutes.

A poly(phenylene ether) is made by the method.

An article comprises the poly(phenylene ether).

The above described and other features are exemplified by the following detailed description.

DETAILED DESCRIPTION

The present inventors have advantageously discovered a process for preparing poly(phenylene ether) using a continuous flow reactor with short residence times (e.g., ≤30 minutes), low metal catalyst concentrations, and using air as an oxidant. Continuous processes can offer advantages such as lower operating costs compared to batch production. The resulting poly(phenylene ether)s can advantageously exhibit high molecular weights and narrow molecular weight distributions, as well as reduced biphenyl and quinone side product content.

Accordingly, an aspect of the present disclosure is a method for preparing a poly(phenylene ether). The method comprises, in an embodiment, feeding a reaction mixture to a continuous flow reactor. The components of the reaction mixture can be precombined or fed into the reactor separately to provide the reaction mixture in the reactor.

The continuous flow reactor allows for intense heat and mass transfer between multiple phases while offering limited back mixing of individual phases in the flow direction. The volumetric mass transfer coefficients are preferably in excess of 0.1 s$^{-1}$, for example, 0.1 to 5 s$^{-1}$. Heat transfer per unit volume is preferably greater than 500 m$^{-1}$. The flow reactor can also have a surface area to volume ratio of 10 to 1500 m$^{-1}$. Suitable continuous flow reactors can include, but are not limited to microreactors and millireactors. The continuous flow reactor can be a commercially available flow reactor, for example, Advanced-Flow™ Reactor from Corning Inc.; Modular MicroReaction System, Lonza FlowPlate™, ART™ plate reactors and Miprowa™ from Ehrfeld Mikrotechnik BTS GmbH; Qmix™ microreaction system from Cetoni; LABTRIX™ START, LABTRIX™ S1, KILO-FLOW™ and PLANTRIX™ from Chemtrix; HTM™, MR-LAB™, MR PILOT™ and XXL™ SERIES from Little Things Factory; Asia™ Flow Chemistry System from Syrris; KeyChem™, CYTOS-200™ and CYTOS-2000™ from YMC, AMaR-2™ and AMaR-4P™ from AMAR Equipments Pvt Ltd. The inner diameter of the flow reactor is not limited to any specific value. In a specific, non-limiting example, an exemplary inner diameter of a reactor can be 0.01 to 10 mm, or 0.05 to 8 mm, or 0.1 to 5 mm. The flow reactor can have a single passage, parallel passages or serial passages.

The reaction mixture comprises a phenol, a transition metal catalyst, and an organic solvent. The phenol can be a monohydric phenol having the structure

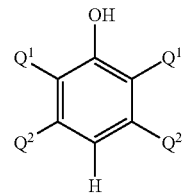

wherein each occurrence of $Q^1$ is independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and wherein each occurrence of $Q^2$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms. In some embodiments, each occurrence of $Q^1$ is methyl and each occurrence of $Q^2$ is hydrogen and the phenol is 2,6-xylenol (also referred to as dimethyl phenol). In some embodiments, each occurrence of $Q^1$ is methyl, one occurrence of $Q^2$ is hydrogen and the other is methyl, and the phenol is 2,3,6-trimethylphenol.

Suitable transition metal catalysts for the synthesis of poly(phenylene ether) include those comprising such catalyst metals as manganese, chromium, copper, and combinations thereof. Among metal complex catalysts, it is preferred to use a copper complex catalyst comprising a secondary alkylene diamine ligand. The copper source for the copper complex comprising a secondary alkylene diamine can comprise a salt of cupric or cuprous ion, including halides, oxides and carbonates. Alternatively, copper can be provided in the form of a pre-formed salt of the alkylene diamine ligand. Preferred copper salts include cuprous halides, cupric halides, and their combinations. Especially preferred are cuprous bromides, cupric bromides, and combinations thereof.

A preferred copper complex catalyst comprises a secondary alkylene diamine ligand. Suitable secondary alkylene diamine ligands are described in U.S. Pat. No. 4,028,341 to Hay and are represented by the formula

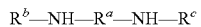

$R^b$—NH—$R^a$—NH—$R^c$ wherein $R^a$ is a substituted or unsubstituted divalent residue wherein two or three aliphatic carbon atoms form the closest link between the two diamine nitrogen atoms; and $R^b$ and $R^c$ are each independently isopropyl or a substituted or unsubstituted $C_{4-8}$ tertiary alkyl group. Examples of $R^a$ include ethylene, 1,2-propylene, 1,3-propylene, 1,2-butylene, 1,3-butylene, 2,3-butylene, the various pentylene isomers having from two to three carbon atoms separating the two free valances, phenylethylene, tolylethylene, 2-phenyl-1,2-propylene, cyclohexylethylene, 1,2-cyclohexylene, 1,3-cyclohexylene, 1,2-cyclopropylene, 1,2-cyclobutylene, 1,2-cyclopentylene, and the like. Preferably, $R^a$ is ethylene. Examples of $R^b$ and $R^c$ can include isopropyl, t-butyl, 2-methyl-but-2-yl, 2-methyl-pent-2-yl, 3-methyl-pent-3-yl, 2,3-dimethyl-buty-2-yl, 2,3-dimethylpent-2-yl, 2,4dimethyl-pent-2-yl, 1-methylcyclopentyl, 1-methylcyclohexyl and the like. A highly preferred example of $R^b$ and $R^c$ is t-butyl. An exemplary secondary alkylene diamine ligand is N,N'-di-t-butylethylenediamine (DBEDA). Suitable molar ratios of copper to secondary alkylene diamine are from 1:1 to 1:5, preferably 1:1 to 1:3, more preferably 1:1.5 to 1:2.

The preferred copper complex catalyst comprising a secondary alkylene diamine ligand can further comprise a secondary monoamine. Suitable secondary monoamine ligands are described in commonly assigned U.S. Pat. No. 4,092,294 to Bennett et al. and represented by the formula

$R^d$—NH—$R^e$ wherein $R^d$ and $R^e$ are each independently substituted or unsubstituted $C_{1-12}$ alkyl groups, and preferably substituted or unsubstituted $C_{3-6}$ alkyl groups. Examples of the secondary monoamine include di-n-propylamine, di-isopropylamine, di-n-butylamine, di-sec-butylamine, di-t-butylamine, N-isopropyl-t-butylamine, N-sec-butyl-t-butylamine, di-n-pentylamine, bis(1,1-dimethylpropyl)amine, and the like. A highly preferred secondary monoamine is di-n-butylamine (DBA). A suitable molar ratio of copper to secondary monoamine is from 1:1 to 1:10, preferably 1:3 to 1:8, and more preferably 1:4 to 1:7.

The preferred copper complex catalyst comprising a secondary alkylene diamine ligand can further comprise a tertiary monoamine. Suitable tertiary monoamine ligands are described in the abovementioned Hay U.S. Pat. No. 4,028,341 and Bennett U.S. Pat. No. 4,092,294 patents and include heterocyclic amines and certain trialkyl amines characterized by having the amine nitrogen attached to at least two groups which have a small cross-sectional area. In the case of trialkylamines, it is preferred that at least two of the alkyl groups be methyl with the third being a primary $C_{1-8}$ alkyl group or a secondary $C_{3-8}$ alkyl group. It is especially preferred that the third substituent have no more than four carbon atoms. A highly preferred tertiary amine is dimethylbutylamine (DMBA). A suitable molar ratio of copper to tertiary amine is less than 1:20, preferably less than 1:15, preferably 1:1 to less than 1:15, more preferably 1:1 to 1:12.

A suitable molar ratio of metal complex catalyst (measured as moles of metal) to phenol is 1:50 to 1:400, preferably 1:100 to 1:200, more preferably 1:100 to 1:180.

The reaction conducted in the presence of a metal complex catalyst can optionally be conducted in the presence of bromide ion. It has already been mentioned that bromide ion can be supplied as a cuprous bromide or cupric bromide salt. Bromide ion can also be supplied by addition of a 4-bromophenol, such as 2,6-dimethyl-4-bromophenol. Additional bromide ion can be supplied in the form of hydrobromic acid, an alkali metal bromide, or an alkaline earth metal bromide. Sodium bromide and hydrobromic acid are highly preferred bromide sources. A suitable ratio of bromide ion to copper ion is 2 to 20, preferably 3 to 20, more preferably 4 to 7.

The reaction mixture further comprises an organic solvent. Suitable organic solvents include alcohols, ketones, aliphatic and aromatic hydrocarbons, chlorohydrocarbons, nitrohydrocarbons, ethers, esters, amides, mixed ether-esters, sulfoxides, and the like, providing they do not interfere with or enter into the oxidation reaction. Preferably, the solvent is selected so as to avoid any precipitation in the reactor. The organic solvent can comprise, for example, toluene, benzene, xylene, chlorobenzene, ortho-dichlorobenzene, nitrobenzene, trichloroethylene, ethylene dichloride, dichloromethane, chloroform, tetrachloroethane, or a combination thereof. Preferred solvents include aromatic hydrocarbons. In some embodiments, the organic solvent comprises toluene.

A suitable starting concentration of phenol can be 5 to 35 weight percent, or 5 to 15 weight percent, preferably 5 to 10 weight percent, more preferably 6 to 10 weight percent, or 15 to 35 weight percent, or 20 to 32 weight percent, based on the total weight of the phenol and solvent. All the phenol can be added at the beginning of the reaction. Alternatively, the phenol can be added in discrete or continuous amounts during the course of the reaction.

The reaction mixture can optionally further comprise one or more additional components, including a lower alkanol or glycol, a small amount of water, or a phase transfer agent. It is generally not necessary to remove reaction byproduct water during the course of the reaction. Suitable phase transfer agents can include, for example, a quaternary ammonium compound, a quaternary phosphonium compound, a tertiary sulfonium compound, or a combination thereof. Preferably, the phase transfer agent can be of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl, Br, a $C_{1-8}$ alkoxy or a $C_{6-18}$ aryloxy. An effective amount of a phase transfer agent can be 0.1 to 10 wt %, or 0.5 to 2 wt %, each based on the weight of the reaction mixture. In a specific embodiment, a phase transfer agent is present and comprises N,N,N'N'-didecyldimethyl ammonium chloride.

In some embodiments, the reaction mixture can optionally further comprise a dihydric phenol, preferably 2,2',6,6'-tetramethylbisphenol A, 2,2',6-6'-tetramethylbiphenol, 2,2', 3,3',5,5'-hexamethyl-[1,1'-biphenyl]-4,4'-diol, or a combination thereof. When present, the dihydric phenol can be included in the reaction mixture in an amount of 1 to 20 weight percent, or 1 to 10 weight percent, based on the total weight of the reaction mixture.

The method further comprises feeding air to the continuous flow reactor containing the reaction mixture. Feeding the air can be at a flow rate effective to provide a phenol:oxygen molar ratio of 1:1 to 1:1.2, preferably 1:1.1. In some embodiments, the air can be a combination comprising oxygen and nitrogen. In some embodiments, the air comprises less than 50% oxygen, or less than 40% oxygen, or at least 5% oxygen or at least 10% oxygen. Within this range, the air comprises 15 to 25%, or 19 to 22% oxygen. In some embodiments, the balance is nitrogen. The air can include less than 0.1 ppm of hydrocarbons.

Upon feeding the reaction mixture and the air to the continuous flow reactor, the reaction mixture can be oxidatively polymerized to form the desired poly(phenylene ether). The polymerization can be conducted at a temperature of 20 to 60° C., preferably 25 to 55° C., more preferably 30 to 50° C. Advantageously, the reaction mixture can have a residence time of less than or equal to 30 minutes, or less than or equal to 15 minutes, preferably 3 to 20 minutes, more preferably 3 to 15 minutes in the continuous flow reactor. The oxidative polymerization can be performed at a pressure of greater than 150 kPa, preferably greater than or equal to 200 kPa, more preferably greater than or equal to 500 kPa, even more preferably greater than or equal to 1000 kPa. In some embodiments, the pressure can be less than or equal to 2000 kPa, or less than or equal to 1500 kPa. In an advantageous feature, the continuous flow reactor of the present disclosure can have a significantly reduced oxygen head space compared to other conventional reactors, and thus the reaction can be performed at higher temperatures without comprising safety.

The reaction can be terminated by stopping the oxygen addition when the target intrinsic viscosity is reached. Other suitable methods for terminating the reaction include the addition of a mineral or organic acid, such as acetic acid, or the addition of a sequestrant as described in greater detail below.

The method can further comprise recovering the copper catalyst using an aqueous sequestrant solution. Suitable techniques for recovering the catalyst metal from the metal complex catalyst include those described in commonly assigned U.S. Pat. No. 3,838,102 to Bennett et al., U.S. Pat. No. 3,951,917 to Floryan et al., and U.S. Pat. No. 4,039,510 to Cooper et al. These techniques comprise the addition of one or more sequestrants to complex the catalyst metal and facilitate its separation from the poly(phenylene ether) product. A preferred method for removing catalyst metal from the poly(phenylene ether) product is described in U.S. application Ser. No. 09/616,737. This method, which eliminates multiple rinses with a complexing reagent, includes removing the catalyst from the polymerization mixture by mixing the polymerization mixture with a complexing reagent and liquid/liquid centrifuging the multiphase mixture. Water is then added to the polymer phase prior to a subsequent liquid/liquid centrifuge process. In general, suitable sequestrants include polyfunctional carboxylic acid-containing compounds, such as citric acid, tartaric acid, nitrilotriacetic acid, ethylenediaminetetraacetic acid, ethylenediaminedisuccinic acid, hydroxyethylethylenediaminetriacetic acid, diethylenetriaminepentaacetic acid, and the like. These sequestrants can be used as their free acids or salts of, for example, their alkali metals, alkaline earth metals, and nitrogenous cations. Preferred sequestrants include nitrilotriacetic acid, ethylenediamine tetraacetic acid and their salts. Suitable molar ratios of sequestrant to catalyst metal are 1:1 to 5:1, preferably 1.1:1 to 3:1, more preferably 1:1.5 to 1:2.5.

The method can further comprise isolating the poly(phenylene ether), for example, by precipitation. Precipitation of the poly(phenylene ether) can be induced by appropriate selection of reaction solvent described above, or by the addition of an anti-solvent to the reaction mixture. Suitable anti-solvents include lower alkanols having one to about ten carbon atoms, acetone and hexane. The preferred anti-solvent is methanol. The anti-solvent can be employed at a range of concentrations relative to the organic solvent, with the optimum concentration depending on the identities of the organic solvent and anti-solvent, as well as the concentration and intrinsic viscosity of the poly(phenylene ether) product. It has been discovered that when the organic solvent is toluene and the anti-solvent is methanol, a toluene:methanol weight ratio of 50:50 to 80:20 is suitable, with ratios of 60:40 to 70:30 being preferred, and 63:37 to 67:33 being more preferred. These preferred and more preferred ratios are useful for producing a desirable powder morphology for the isolated poly(phenylene ether) resin, without generating either stringy powder or excessive powder fines.

The method can optionally comprise pre-concentrating the reaction mixture prior to addition of the anti-solvent. Although it is not possible to pre-concentrate to as great a degree as for lower intrinsic viscosity poly(phenylene ether) s, pre-concentrations of, for example, 15 weight percent poly(phenylene ether) are possible. Any suitable method for pre-concentration can be employed. For example, the pre-concentration can be carried out by preheating the solution above its atmospheric boiling point at a pressure modestly elevated above one atmosphere (so that no boiling takes place in the heat exchanger) followed by flashing the solution to a lower pressure and temperature, whereby vaporization of a substantial part of the toluene takes place and the required heat of vaporization is supplied by the heat transferred in the heat exchanger as sensible heat of the solution.

The isolated poly(phenylene ether) can have an intrinsic viscosity of greater than or equal to 0.04 to 2 deciliters per gram, preferably 0.06 to 2 deciliters per gram, more preferably 0.8 to 2 deciliters per gram, even more preferably 0.08 to 1.6 deciliters per gram, or 0.06 to 1.0 deciliters per gram as measured in chloroform at 25° C. using an Ubbelohde viscometer.

The isolated poly(phenylene ether) can also have a dispersity of less than 3, for example 1.2 to 2.9, or 1.5 to 2.9, or 1.5 to 2.7. Dispersity can be determined using gel permeation chromatography using chloroform relative to polystyrene standards.

In some embodiments, the poly(phenylene ether) prepared according to the method described herein can advantageously have a reduced biphenyl content, quinone content, or both. For example, the poly(phenylene ether) can have a combined biphenyl and quinone content of less than 0.5 weight percent based on the weight of the phenol used in the oxidative polymerization.

Thus, the poly(phenylene ether) prepared according to the above method represents another aspect of the present disclosure. The poly(phenylene ether) can comprise repeating structural units having the formula

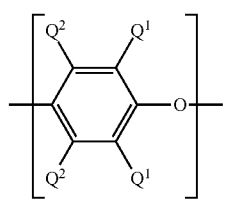

wherein each occurrence of $Q^1$ and $Q^2$ are as defined above. The hydrocarbyl residue can also contain one or more carbonyl groups, amino groups, hydroxyl groups, or the like, or it can contain heteroatoms within the backbone of the hydrocarbyl residue. As one example, $Q^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. In some embodiments, the poly(phenylene ether) is substantially free of the quinone end groups. For example, the poly(phenylene ether) can include less than 1% of quinone end groups. The poly(phenylene ether) can be in the form of a homopolymer, a copolymer, a graft copolymer, an ionomer, or a block copolymer, as well as combinations thereof.

Compositions and articles comprising the poly(phenylene ether) made by the above method represent another aspect of the present disclosure. For example, the poly(phenylene ether) made by the method described herein can be useful for forming a thermoplastic composition which can optionally comprises at least one of a thermoplastic polymer different from the poly(phenylene ether) and an additive composition comprising one or more additives.

The poly(phenylene ether) can be formed into articles by shaping, extruding, or molding. Articles can be molded from the composition by methods including, for example, injection molding, injection compression molding, gas assist injection molding, rotary molding, blow molding, compression molding, and the like. In some embodiments, articles can be formed by injection molding.

This disclosure is further illustrated by the following examples, which are non-limiting.

EXAMPLES

Materials used for the following Examples are described in Table 1.

TABLE 1

| Component | Description | Supplier |
|---|---|---|
| DMP | 2,6-Dimethylphenol, CAS Reg. No. 576-26-1 | Sigma Aldrich |
| TMBPA | 2,2',6,6'-Tetramethyl Bisphenol A, CAS Reg. No. 5613-46-7 | Deepak Novochem |
| Cu$_2$O | Cuprous oxide, CAS Reg. No. 1317-39-1 | Sigma Aldrich |
| HBr | Hydrobromic acid, 48 wt. % aqueous solution; CAS Reg. No. 10035-10-6 | Sigma Aldrich |
| DBEDA | Di-tert-butylethylenediamine, CAS Reg. No. 4062-60-6 | Sigma Aldrich |
| DBA | Di-n-butylamine, CAS Reg. No. 111-92-2 | Sigma Aldrich |
| DMBA | N,N-Dimethylbutylamine. CAS Reg. No. 927-62-8 | Sigma Aldrich |
| DDAC | N,N,N'N'-Didecyldimethyl ammonium chloride, CAS Reg. No. 7173-51-5, available under the tradename MAQUAT 4450T | Pilot Chemical Company |
| Toluene | Toluene, CAS Reg. No. 108-88-3 | Sigma Aldrich |
| Air | Air/B/CA/Z/7.0; Zero grade Air | Bhuruka gases limited |
| Oxygen | O2/B/OX/5.0/7.0; 99.99% purity | Bhuruka gases limited |

The effect of pressure and use of air as an oxidant source was first demonstrated for a copolymer of DMP and TMBPA. The reaction mixture used in this example was prepared according to the composition described in Table 2. The amount of each component is given in weight percent based on the total weight of the reaction mixture. The components were stirred well to ensure dissolution prior to introduction into the reactor.

TABLE 2

| Component | Weight (grams) | Moles | Weight percent in feed |
|---|---|---|---|
| DMP | 69.17 | 0.57 | 24.36 |
| TMBPA | 14.62 | 0.05 | 5.15 |
| Cu$_2$O | 0.05 | 0.0004 | 0.02 |
| HBr | 0.65 | 0.01 | 0.23 |
| DMBA | 1.97 | 0.02 | 0.69 |
| DBA | 1.00 | 0.01 | 0.35 |
| Diamine mix[1] | 0.48 | 0.00 | 0.17 |
| Toluene | 196.00 | 2.13 | 69.03 |

[1]Diamine mix includes 0.14 grams DBEDA, 0.04 grams DDAC, and 0.3 grams toluene In Comparative Examples 1 and 2, the above reaction mixture was used in a batch polymerization with pure oxygen as the oxidant and a temperature of 42° C. These polymerizations were conducted at atmospheric pressure (i.e., 1 atmosphere or 101.325 kPa). Results of this polymerization are shown in Table 3. For Comparative Examples 1 and 2, HPLC was used to determine the weight percent of DMP in the reaction mixture over the course of the polymerization. For all flow reactions, the weight percent of DMP in the reaction mixture at varying times was determined by an online infrared spectroscopy method using a Mettler Toledo ReactIR™ 45m with fibre optic probe and Dicomp ATR crystal and a Mettler Toledo ReactIR™ 45m with micro flow cell and diamond ATR crystal. DMP concentration was determined from a calibration curve where the range of 1350 to 1200 cm$^{-1}$ was analyzed to observe the maximum peak height at 1260 cm$^{-1}$. This value was plotted as a linear regression with the obtained HPLC data to construct a calibration curve for determining DMP concentration.

TABLE 3

| CE 1 | | CE 2 | |
|---|---|---|---|
| Reaction Time (min) | DMP in the reaction mixture (wt %) | Reaction Time (min) | DMP in the reaction mixture (wt %) |
| 0 | 24.33 | 0 | 22.2 |
| 15 | 19.06 | 49 | 13.3 |
| 30 | 15.87 | 79 | 8.5 |
| 45 | 12.38 | 109 | 6.4 |
| 55 | 10.27 | 119 | 4.4 |
| 80 | 7.7 | 129 | 3.7 |
| 105 | 5.93 | | |
| 130 | 4.24 | | |

Comparative Examples 3-5 in Table 4 below demonstrate the copolymerization of DMP and TMBPA using the Table 2 reaction mixture in a continuous flow reactor with pure oxygen as oxidant and at a temperature of 42° C. An Advanced Flow Reactor AFR, available from Corning, was used for the flow polymerizations. The flow reactor used is a reactor in plate form, where there are multiple plates arranged in series to provide for sufficient reactor volume.

The polymerizations of Comparative Examples 3-5 in the flow reactor were conducted at a liquid flow rate of 12 milliliters/minute and a gas (oxygen at atmospheric condition) flow rate of 250 milliliters/minute. Comparative Examples 3-5 were conducted at atmospheric pressure (i.e., 1 atmosphere or 101.325 kPa). The weight percent of DMP in the reaction mixture at varying times was determined by online infrared spectroscopy as described above.

TABLE 4

| Residence time (min) | CE 3 DMP (wt %) | CE 4 DMP (wt %) | CE 5 DMP (wt %) |
|---|---|---|---|
| 0 | 25 | 25.1 | 24.6 |
| 4 | 17.4 | 16.8 | 11.07 |
| 8 | 11.5 | 7.7 | 6.92 |
| 11 | 7.2 | 2.7 | 3.44 |
| 15 | 2.1 | 0 | 0.72 |
| 19 | 0 | 0 | 0 |

Examples 1-2 in Table 5 below demonstrate the copolymerization of DMP and TMBPA using the Table 2 reaction mixture in a continuous flow reactor with air as oxidant and at a temperature of 42° C. In Example 1, the reaction was conducted at a pressure of 5 bar (500 kPa). In Example 2, the reaction was conducted at a pressure of 10 bar (1000 kPa). These polymerizations in the flow reactor were conducted at a liquid flow rate of 12 milliliters/minute and a gas flow rate of 250 milliliters/minute. The weight percent of DMP in the reaction mixture at varying times was determined by online infrared spectroscopy as described above.

TABLE 5

| Residence time (min) | E1 DMP (wt %) | E2 DMP (wt %) |
|---|---|---|
| 0 | 23.69 | 23.33 |
| 3.8 | 5.28 | 3.52 |
| 7.5 | 1.79 | 3.31 |
| 11.25 | 0.52 | |

It can be seen from the data presented in Tables 3-5 that use of a flow reactor enables the use of air as an oxidant. Further, the polymerizations can be conducted under pressure to give short reaction times.

The effect of pressure and use of air as an oxidant source was also demonstrated for a homopolymer of DMP. The reaction mixture used in these examples was prepared according to the composition described in Table 6. The amount of each component is given in weight percent based on the total weight of the reaction mixture. The components were stirred well to ensure dissolution prior to introduction into the reactor.

TABLE 6

| Component | Weight (grams) | Moles | Weight percent in feed |
|---|---|---|---|
| DMP | 65.00 | 0.53 | 23.67 |
| Cu$_2$O | 0.08 | 0.0005 | 0.03 |
| HBr | 0.43 | 0.01 | 0.16 |
| DMBA | 2.11 | 0.02 | 0.77 |
| DBA | 0.62 | 0.00 | 0.23 |
| Diamine mix[1] | 0.36 | 0.00 | 0.13 |
| Toluene | 206.00 | 2.24 | 75.02 |

[1]Diamine mix includes 0.11 grams DBEDA, 0.03 grams DDAC, and 0.22 grams toluene In Comparative Example 6, the above reaction mixture was used in a batch polymerization with pure oxygen as the oxidant and a temperature of 42° C. This polymerization was conducted at atmospheric pressure (i.e., 1 atmosphere or 101.325 kPa). Results of this polymerization are shown in Table 7. The weight percent of DMP in the reaction mixture at varying times was determined by online infrared spectroscopy as described above.

TABLE 7

| | CE 6 |
|---|---|
| Reaction Time (min) | DMP in the reaction mixture (wt %) |
| 0 | 22.52 |
| 10 | 16.61 |
| 28 | 13.37 |
| 33 | 10.45 |
| 48 | 7.15 |
| 63 | 4.61 |
| 73 | 4.53 |
| 88 | 3.01 |
| 108 | 2.78 |

Comparative Example 7 in Table 8 below demonstrates the homopolymerization of DMP using the Table 6 reaction mixture in a continuous flow reactor with pure oxygen as oxidant and at a temperature of 42° C. This polymerization in the flow reactor was conducted at a liquid flow rate of 12 milliliters/minute and a gas flow rate of 250 milliliters/minute. Comparative Example 7 was conducted at atmospheric pressure (i.e., 1 atmosphere or 101.325 kPa). The weight percent of DMP in the reaction mixture at varying times was determined by online infrared spectroscopy as described above.

TABLE 8

| Residence time, min | CE 7 DMP (wt %) |
|---|---|
| 0 | 22.76 |
| 3.75 | 13.46 |
| 7.5 | 4.88 |
| 11.25 | 1.19 |
| 15 | 0.31 |

Examples 3-4 in Table 9 below demonstrate the homopolymerization of DMP using the Table 6 reaction mixture in a continuous flow reactor with air as oxidant and at a temperature of 42° C. In Example 3, the reaction was conducted at a pressure of 5 bar (500 kPa). In Example 4, the reaction was conducted at a pressure of 10 bar (1000 kPa). These polymerizations in the flow reactor were conducted at a liquid flow rate of 12 milliliters/minute and a gas flow rate of 250 milliliters. The weight percent of DMP in the reaction mixture at varying times was determined by online infrared spectroscopy as described above.

TABLE 9

| Residence time, min | E3 DMP (wt %) | E4 DMP (wt %) |
|---|---|---|
| 0 | 23.69 | 22.59 |
| 3.75 | 5.28 | 2.2 |
| 7.5 | 1.79 | 1.68 |
| 11.25 | 0.52 | 0.06 |

It can be seen from the data presented in Tables 7-9 that use of a flow reactor enables the use of air as an oxidant for homopolymerization of DMP. Further, the polymerizations can be conducted under pressure to give short reaction times.

Another advantage of the present method using a flow reactor is that the formation of side products (e.g., quinones and biphenyl) is low. Table 10 below shows a comparison of the weight percent of side products (tetramethyl diphenyl quinone (TMDQ) units and tetramethyl biphenyl (TMPA) units) compared to the weight of DMP (i.e., the initial weight of DMP used at the outset of polymerization) for a copolymer of DMP and TMBPA made according to a batch process (CE 8) and a flow process (E5). In both CE8 and CE9, oxygen was used as the oxidant, and the reactions were conducted at atmospheric pressure. Other reaction conditions were the same as described above.

TABLE 10

| CE8 | | CE9 | |
|---|---|---|---|
| Time (min) | % (TMBP + TMDQ)/DMP | Time (min) | % (TMBP + TMDQ)/DMP |
| 0 | 0.37 | 0 | 0.41 |
| 15 | 0.86 | 3.8 | 0.81 |
| 30 | 0.82 | 7.5 | 0.41 |
| 45 | 0.95 | 11.3 | 0.41 |
| 80 | 0.82 | 15.0 | 0.41 |
| 130 | 0.62 | 19.7 | |

Example 5 in Table 11 below demonstrates the homopolymerization of DMP using the Table 2 reaction mixture in a batch reactor with air as oxidant and at a temperature of 42° C. This polymerization was conducted at atmospheric pressure (i.e., 1 atmosphere or 101.325 kPa). The weight percent of DMP, TMBP and TMDQ in the reaction mixture at varying times were determined by HPLC.

TABLE 11

| E5 | | |
|---|---|---|
| Time (min) | DMP in reaction mixture (wt %) | % (TMBP + TMDQ)/DMP |
| 0 | 23.63 | 1.29 |
| 30 | 22.46 | 1.36 |
| 60 | 21.12 | 1.65 |
| 90 | 19.44 | 1.85 |
| 120 | 18.57 | 2.02 |
| 150 | 17.5 | 2.34 |

As seen in Tables 10 and 11, the amount of side products resulting from C—C coupling (e.g., quinone and biphenyl side products) can be reduced by almost half when a flow reactor is used.

Table 12 below shows the weight average molecular weight (Mw), dispersity (PDI) and intrinsic viscosity (IV) for the polymers prepared by the processes of CE1, CE7, E1, and E2. Intrinsic viscosity was determined at 25° C. in chloroform using an Ubbelohde viscometer, and Mw and PDI were determined using gel permeation chromatography using chloroform relative to polystyrene standards.

TABLE 12

| Example | Mw | PDI | IV |
|---|---|---|---|
| CE1 | 4381 | 2.49 | 0.09 |
| CE7 | 3194 | 2.03 | 0.08 |
| E1 | 2540 | 1.9 | 0.085 |
| E2 | 3510 | 2.05 | 0.09 |

This disclosure further encompasses the following aspects.

Aspect 1: A method for preparing a poly(phenylene ether), the method comprising: feeding air to a continuous flow reactor that contains a reaction mixture comprising a phenol, a transition metal catalyst, and an organic solvent; and oxidatively polymerizing the reaction mixture at a temperature of 20 to 60° C., preferably 25 to 55° C., more preferably 30 to 50° C. and a pressure of greater than 150 kPa, preferably greater than or equal to 200 kPa, more preferably greater than or equal to 500 kPa, even more preferably greater than or equal to 1000 kPa to form a poly(phenylene ether); wherein the reaction mixture has a residence time in the continuous flow reactor of less than or equal to 30 minutes, preferably 3 to 20, more preferably 3 to 15 minutes.

Aspect 2: The method of aspect 1, wherein the continuous flow reactor is characterized by a volumetric mass transfer coefficient of 0.1 to 5 $sec^{-1}$ and a surface area to volume ratio of 10 to 1500 $m^{-1}$.

Aspect 3: The method of any one of aspects 1 to 2, wherein the phenol comprises 2,6-dimethylphenol, 2,3,6-trimethylphenol, or a combination thereof, preferably 2,6-dimethylphenol.

Aspect 4: The method of any one of aspects 1 to 3, wherein the transition metal catalyst is a copper-amine catalyst, preferably comprising a copper ion and a hindered secondary amine; preferably wherein the hindered secondary amine has the formula $R_bHN-R_a-NHR_c$ wherein $R_a$ is $C_{2-4}$ alkylene or $C_{3-7}$ cycloalkylene and $R_b$ and $R_c$ are isopropyl or $C_{4-8}$ tertiary alkyl wherein only the α-carbon atom has no hydrogen atoms, there being at least two and no more than three carbon atoms separating the two nitrogen atoms; more preferably wherein the hindered secondary amine is di-tert-butylethylenediamine.

Aspect 5: The method of any one of aspects 1 to 4, wherein the organic solvent comprises toluene, benzene, xylene, chlorobenzene, ortho-dichlorobenzene, nitrobenzene, trichloroethylene, ethylene dichloride, dichloromethane, chloroform, tetrachloroethane or a combination thereof, preferably toluene.

Aspect 6: The method of any one or more of aspects 1 to 5, wherein the reaction mixture further comprises a dihydric phenol, preferably 2,2',6,6'-tetramethylbisphenol A, 2,2',6-6'-tetramethylbiphenol, 2,2',3,3',5,5'-hexamethyl-[1,1'-biphenyl]-4,4'-diol, or a combination thereof.

Aspect 7: The method of any one of aspects 1 to 6, wherein the reaction mixture further comprises one or more of a secondary monoamine, a tertiary monoamine, or a combination thereof, preferably wherein the secondary monoamine comprises di-n-butylamine and the tertiary monoamine comprises N,N-dimethylbutylamine; a bromide ion source, preferably hydrobromic acid; and a phase transfer agent, preferably wherein the phase transfer agent comprises a quaternary ammonium compound, a quaternary phosphonium compound, a tertiary sulfonium compound, or a combination thereof, more preferably wherein the phase transfer agent comprises N,N,N'N'-didecyldimethyl ammonium chloride.

Aspect 8: The method of any one of aspects 1 to 7, wherein feeding the air to the reactor is at a flow rate effective to provide a phenol:oxygen molar ratio of 1:1 to 1:1.2, preferably 1:1.1.

Aspect 9: The method of any one of aspects 1 to 8, further comprising isolating the poly(phenylene ether) from the reaction mixture.

Aspect 10: The method of any one of aspects 1 to 9, wherein the poly(phenylene ether) has an intrinsic viscosity of 0.04 to 2 deciliter per gram, a polydispersity index of less than 3, or both.

Aspect 11: The method of any one of aspects 1 to 10, wherein the poly(phenylene ether) has a combined biphenyl and quinone content of less than 0.5 weight percent based on the weight of the phenol used in the oxidative polymerization.

Aspect 12: A poly(phenylene ether) made by the method of any one or more of aspects 1 to 11.

Aspect 13: The poly(phenylene ether) of aspect 12, wherein the poly(phenylene ether) has a combined biphenyl and quinone content of less than 0.5 weight percent based on the weight of the phenol used in the oxidative polymerization.

Aspect 14: An article comprising the poly(phenylene ether) of aspects 12 or 13.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. The term "combination thereof" as used herein includes one or more of the listed elements, and is open, allowing the presence of one or more like elements not named. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl), a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for preparing a poly(phenylene ether), the method comprising:
   feeding air to a continuous flow reactor that contains a reaction mixture comprising a phenol, a transition metal catalyst, and an organic solvent; and
   oxidatively polymerizing the reaction mixture at a temperature of 20 to 60° C. and a pressure of greater than 150 kPa to form a poly(phenylene ether);
   wherein the reaction mixture has a residence time in the continuous flow reactor of less than or equal to 30 minutes.

2. The method of claim 1, wherein the continuous flow reactor is characterized by a volumetric mass transfer coefficient of 0.1 to 5 sec$^{-1}$ and a surface area to volume ratio of 10 to 1500 m$^{-1}$.

3. The method of claim 1, wherein the phenol comprises 2,6-dimethylphenol, 2,3,6-trimethylphenol, or a combination thereof.

4. The method of claim 1, wherein the transition metal catalyst is a copper-amine catalyst.

5. The method of claim 1, wherein the organic solvent comprises toluene, benzene, xylene, chlorobenzene, ortho-dichlorobenzene, nitrobenzene, trichloroethylene, ethylene dichloride, dichloromethane, chloroform, tetrachloroethane or a combination thereof.

6. The method of claim 1, wherein the reaction mixture further comprises a dihydric phenol.

7. The method of claim 1, wherein the reaction mixture further comprises one or more of
   a secondary monoamine, a tertiary monoamine, or a combination thereof;
   a bromide ion source; and
   a phase transfer agent.

8. The method of claim 1, wherein feeding the air to the reactor is at a flow rate effective to provide a phenol:oxygen molar ratio of 1:1 to 1:1.2.

9. The method of claim 1, further comprising isolating the poly(phenylene ether) from the reaction mixture.

10. The method of claim 1, wherein the poly(phenylene ether) has an intrinsic viscosity of 0.04 to 2 deciliter per gram as measured in chloroform at 25° C. using an Ubbelohde viscometer, a polydispersity index of less than 3 determined using gel permeation chromatography using chloroform relative to polystyrene standards, or both.

11. The method of claim 1, wherein the poly(phenylene ether) has a combined biphenyl and quinone content of less than 0.5 weight percent based on the weight of the phenol used in the oxidative polymerization.

12. A poly(phenylene ether) made by the method of claim 1.

13. The poly(phenylene ether) of claim 12, wherein the poly(phenylene ether) has a combined biphenyl and quinone content of less than 0.5 weight percent based on the weight of the phenol used in the oxidative polymerization.

14. An article comprising the poly(phenylene ether) of claim 12.

15. The method of claim 1, wherein the continuous flow reactor is characterized by a volumetric mass transfer coefficient of 0.1 to 5 sec$^{-1}$.

16. The method of claim 1, wherein the continuous flow reactor is characterized by a surface area to volume ratio of 10 to 1500 m$^{-1}$.

* * * * *